(12) United States Patent
Pechtold

(10) Patent No.: US 7,600,541 B2
(45) Date of Patent: Oct. 13, 2009

(54) OVERFILL PROTECTION FOR LIQUID HYDROGEN TANK

(75) Inventor: Rainer Pechtold, Russelsheim (DE)

(73) Assignee: GM Global Technology Operations, Inc.

( * ) Notice: Subject to any disclaimer, the term of this patent is extended or adjusted under 35 U.S.C. 154(b) by 642 days.

(21) Appl. No.: 11/127,339

(22) Filed: May 12, 2005

(65) Prior Publication Data
US 2006/0254676 A1 Nov. 16, 2006

(51) Int. Cl.
B65B 31/04 (2006.01)
B65B 3/26 (2006.01)

(52) U.S. Cl. ............................. 141/54; 141/45; 141/59; 141/95; 141/198; 141/214

(58) Field of Classification Search ............. 141/45, 141/55, 59, 83, 95, 198, 206, 210, 214, 346, 141/383
See application file for complete search history.

(56) References Cited

U.S. PATENT DOCUMENTS

| | | | | |
|---|---|---|---|---|
| 4,805,672 A | * | 2/1989 | Berrettini et al. | 141/5 |
| 5,353,849 A | * | 10/1994 | Sutton et al. | 141/44 |
| 5,429,159 A | * | 7/1995 | Tees et al. | 141/59 |
| 5,450,883 A | * | 9/1995 | Payne et al. | 141/59 |
| 5,484,000 A | * | 1/1996 | Hasselmann | 141/59 |
| 5,651,400 A | * | 7/1997 | Corts et al. | 141/59 |
| 5,655,578 A | * | 8/1997 | Farkas | 141/59 |
| 5,673,736 A | * | 10/1997 | Farkas | 141/198 |
| 5,878,767 A | * | 3/1999 | Etling et al. | 141/59 |
| 6,253,802 B1 | * | 7/2001 | Enge | 141/59 |
| 6,305,235 B1 | * | 10/2001 | Geurian et al. | 73/866.5 |
| 6,622,758 B2 | * | 9/2003 | Drube et al. | 141/82 |
| 6,631,621 B2 | * | 10/2003 | VanderWoude et al. | 62/201 |
| 6,802,875 B1 | * | 10/2004 | Kimbara et al. | 48/61 |
| 6,854,492 B2 | * | 2/2005 | Benjey | 141/198 |
| 6,968,868 B2 | * | 11/2005 | Hart et al. | 141/59 |
| 2003/0070434 A1 | * | 4/2003 | Shimada et al. | 62/45.1 |
| 2004/0093874 A1 | * | 5/2004 | Bradley et al. | 141/83 |
| 2005/0158601 A1 | * | 7/2005 | Skala | 429/31 |
| 2006/0118202 A1 | * | 6/2006 | Barnes et al. | 141/348 |

* cited by examiner

*Primary Examiner*—Gregory L Huson
*Assistant Examiner*—Nicolas A Arnett
(74) *Attorney, Agent, or Firm*—Harness, Dickey & Pierce, P.L.C.

(57) ABSTRACT

A fluid supply system is provided which includes a filling station operable to provide a fluid to a fuel storage vessel. The fluid supply system is operable in a first mode to provide a fluid in a liquid phase from the filling station to the storage vessel and is operable in a second mode to prevent the supply of the fluid to the storage vessel. The storage vessel is in fluid communication with the fluid supply system and is operable to receive the fluid in the liquid phase when the fluid supply system is in the first mode and discharge the fluid in a gaseous phase to the filling station. At least one sensor is in communication with the discharge passage and the fluid supply, and operates to cause the fluid supply to operate in the second mode in response to a detected pressure drop.

18 Claims, 3 Drawing Sheets

OVERFILL PROTECTION FOR LIQUID HYDROGEN TANK

FIELD OF THE INVENTION

The present invention relates to fuel cell systems, and more particularly, to an overfill protection for a liquid hydrogen tank.

BACKGROUND OF THE INVENTION

Fuel cell systems generally include a fuel cell stack that produces electrical energy based on a reaction between a hydrogen feed gas and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein.

In a typical fuel cell powered vehicle, the storage of liquid hydrogen requires complex, multi-layer, vacuum super isolated (insulated) tanks due to the low storage temperature of liquid hydrogen (approximately 20 degrees Kelvin or −423.67 Fahrenheit). Generally, these insulated tanks will contain an amount of gaseous hydrogen, some of which must be removed prior to or during filling of these tanks. Typically, not all of the gaseous hydrogen will be removed during filling, as some gaseous hydrogen is desirable within the tank. Thus, a certain level of liquid hydrogen in the tank should not be exceeded. A typical method of overfill protection is to use a level indicator inside the tank to measure the actual filling status. When the desired level is reached, a control system commands a valve to close, so the tank filling process ends. This system depends on a properly working level indicator and software. It is desired, however, to have a second overfilling protection system that is independent from the level indicator. Accordingly, a need exists for a system able to prevent overfilling of the liquid hydrogen tank to ensure that a desired amount of gaseous hydrogen remains in the tank.

SUMMARY OF THE INVENTION

The present invention provides a supply tank or filling station operable to provide a fluid to a fuel storage vessel and a fluid supply system operable in a first position to provide a fluid in a liquid phase from the supply tank to the storage vessel and operable in a second position to prevent the supply of the fluid to the storage tank. The fuel storage vessel is in fluid communication with the fluid supply system and is operable to receive the fluid in the liquid phase when the fluid supply system is in the first position and discharge the fluid in a gaseous phase to the supply tank. At least one pressure sensor is in communication with the discharge passage and the fluid supply, and operates to cause the fluid supply to operate in the second (closed) position in response to a detected pressure change.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses. Although the following exemplary description refers to the use of an overfill protection system for a fuel cell system in a vehicle, it will be understood that the present invention may be applicable to other types of energy generation devices for use in many other types of equipment. It will be further understood that while the following description will relate to the use of a hydrogen feed gas for a fuel cell system, it should be noted that numerous other fuels could be employed, and further, the foregoing description is understood to not limit the appended claims.

Figure 1:
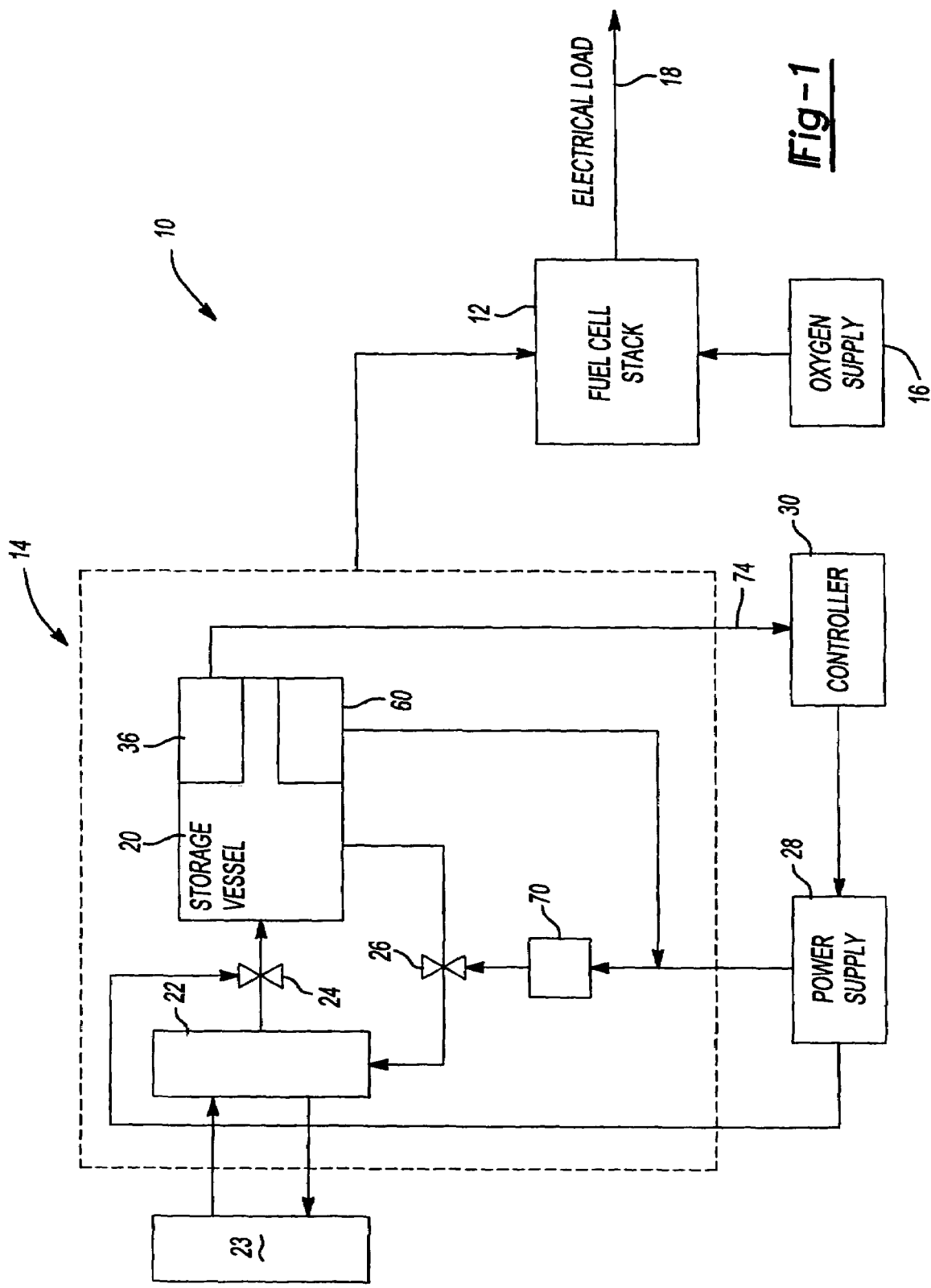
FIG. 1 is a schematic illustration of a fuel cell system including an overfill protection system for a liquid hydrogen tank according to the present invention.

Referring now to FIG. 1, a fuel cell system 10 is shown. The fuel cell system 10 includes a fuel cell stack 12 coupled to a hydrogen supply unit 14 and an oxygen supply unit 16. The fuel cell stack 12 produces electrical power to power at least one electrical load 18. The electrical load(s) 18 can include an electric motor, lights, heaters or any other type of electrically powered components.

Figure 2:
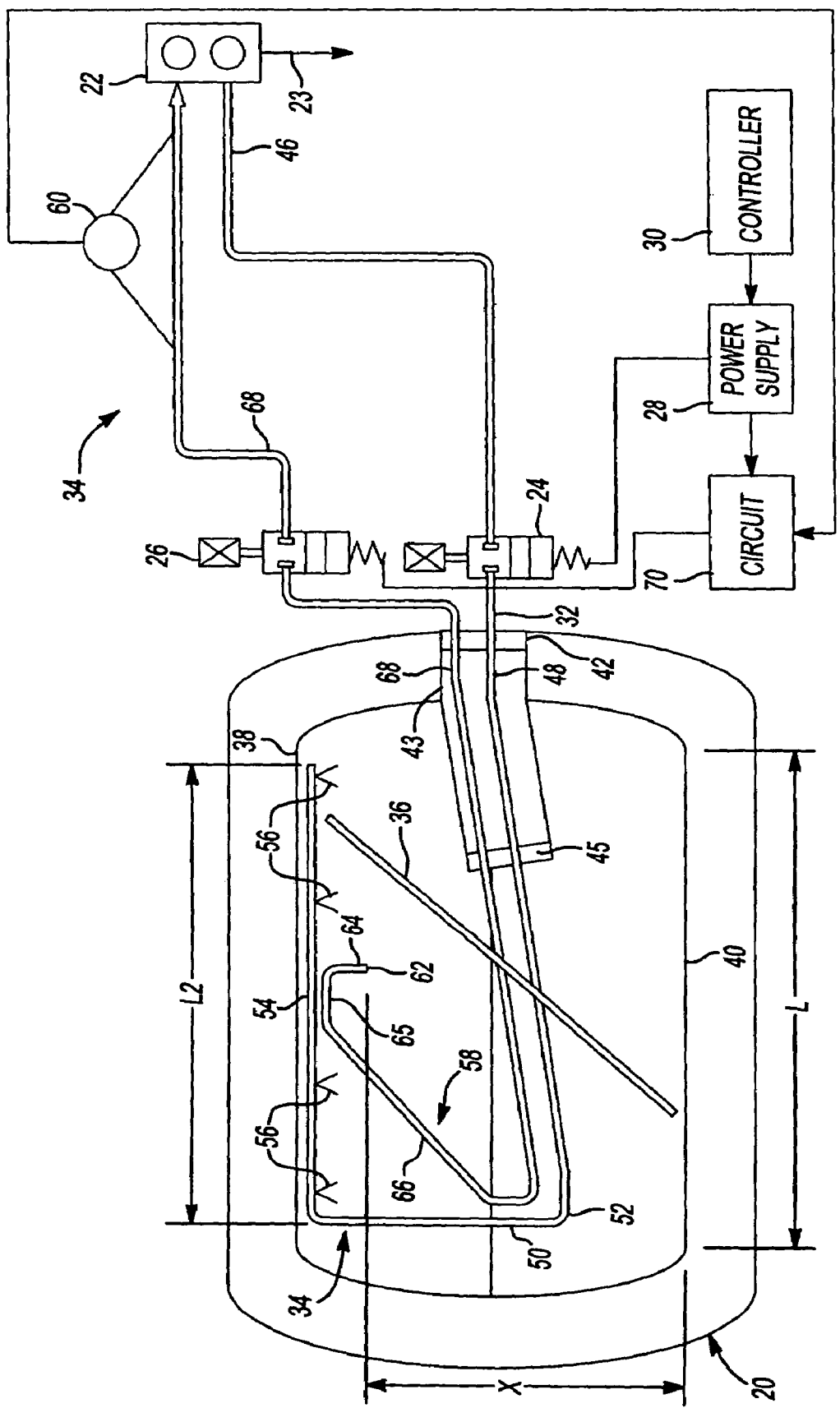
FIG. 2 is a detailed schematic of the overfill protection system of FIG. 1.

With continuing reference to FIG. 1 and additional reference to FIG. 2, the hydrogen supply unit 14 supplies hydrogen or reactant to the fuel cell stack 12. The hydrogen supply unit 14 includes a storage vessel 20 which can be connected with a hydrogen source such as a filling station 23 via a coupling 22. The coupling 22 communicates with a first valve 24 and a second valve 26. The first valve 24 and second valve 26 are controlled by a power supply 28 and a controller 30.

The storage vessel 20, as best shown in FIG. 2, includes a filling pipe 32 fluidly coupled to the coupling 22 for receipt of the hydrogen in liquid form. A discharge system 34 is also provided in communication with the storage vessel 20 for removal of the vaporous hydrogen. A fuel level indicator 36 provides a first indication of the level of liquid hydrogen in the storage vessel 20. The storage vessel 20 is illustrated as cylindrical, having a top 38 and a bottom 40, however, any other design may be used. The storage vessel 20 may be manufactured from any material which is able to insulate liquid hydrogen feed gas from the atmosphere, and may comprise a multi-layer vacuum super insulated tank as is known in the art. The storage vessel 20 is generally of the type which enables the liquid hydrogen feed gas to remain at approximately 20 Kelvin (−423.67 degrees Fahrenheit) for a period of time. The storage vessel 20 may further include an aperture 42 for receipt of the filling pipe 32 and pipe 58 of the discharge system 34 therethrough. Typically, the filling pipe 32 and pipe 58 pass through the aperture 42 into a vacuum pipe 43. The vacuum pipe 43 generally extends into the storage vessel 20 for a predetermined distance prior to terminating at a second aperture 45. The second aperture 45 enables the filling pipe 38 and pipe 58 to enter the interior of the storage vessel 20.

The filling pipe 32 is fluidly coupled to the storage vessel 20 and the coupling 22. In particular, the coupling 22 is adapted to be connected to the filling station 23 which is operable for storing and dispensing the hydrogen to and from the storage vessel 20. It should be noted that the filling pipe 32 as described below is exemplary of one of many appropriate methods of dispensing hydrogen into the storage vessel 20 and thus the foregoing description is not intended to limit the invention as claimed. The filling pipe 32 generally includes an inlet portion 46 operable to be fluidly coupled to the coupling 22 for receipt of the liquid hydrogen. The inlet portion 46 may be coupled to the coupling 22 via any appropriate mechanism, for example, a hose (not shown), pipe, nozzle or other device. The filling pipe 32 also generally includes a first section 48 fluidly coupled to the inlet portion 46 and disposed generally parallel to the bottom 40 of the storage vessel 20. A second section 50 may be fluidly coupled to the first section 48 of the filling pipe 32 via a curved portion 52. The curved portion 52 is designed to ensure the liquid hydrogen remains pressurized to facilitate the liquid hydrogen in exiting the filling pipe 32, as will be described in greater detail below.

The second section 50 extends generally perpendicular from the bottom of the storage vessel 20, such that the second section 50 may serve to elevate a third section 54 fluidly coupled to the second section 50 above the bottom 40 of the storage vessel 20. The third section 54 extends a length L2 across the top 38 of the storage vessel 20, and generally the length L2 is approximately the equivalent but typically less than a length L of the storage vessel 20, however any suitable configuration may be employed. The third section 54 may include at least one spray nozzle 56, but may include a plurality of spray nozzles 56 (four are shown) operable to dispense liquid hydrogen received from the coupling 22 into the storage vessel 20. The spray nozzles 56 are spaced along the third section 54.

The discharge system 34 is fluidly coupled to the storage vessel 20 and includes a pipe 58 having a pressure switch 60 in communication therewith. The pipe 58 facilitates the removal of the gaseous hydrogen from the storage vessel 20, however any other method could be employed to remove the gaseous hydrogen. The pipe 58 is generally shaped to include an inlet 62 which opens in a direction which is typically perpendicular to the bottom 40 of the storage vessel 20 and elevated at least a distance X above the bottom 40 of the storage vessel 20. From the inlet 62, the pipe 58 may include a first section 64 extending generally perpendicular to the bottom 40 of the storage vessel 20 and coupled to a diagonal section 66 by a section 65 which is parallel to the bottom 40. The diagonal section 66 curves to terminate in a second section 68 which provides the exit pathway for the gaseous hydrogen out of the storage vessel 20.

Typically, the second section 68 will be elevated slightly away from the bottom 40 of the storage vessel 20 to not only enable the free flow of the gaseous hydrogen, but also to provide an ease in packaging by enabling the second section 68 to be positioned in proximity to the filling pipe 32 of the storage vessel 20. Although both the pipe 58 and filling pipe 32 are described as having varying sections of different elevations and features, the pipe 58 and filling pipe 32 could be of any shape or design capable of performing the intended functions of the pipe 58 and filling pipe 32, specifically removing the gaseous hydrogen from the storage vessel 20 and dispensing liquid hydrogen into the storage vessel 20.

The second section 68 of the pipe 58 is fluidly coupled to the pressure switch 60 and the second valve 26. When the second valve 26 is in an OPEN position, the second section 68 becomes fluidly coupled to the coupling 22. Thus, when the second valve 26 is in the OPEN position, the gaseous hydrogen is allowed to flow from the storage vessel 20 through the coupling and back to the filling station 23 where the gaseous hydrogen can be condensed into liquid hydrogen for later use. When the second valve 26 is in a CLOSED position, the gaseous hydrogen is prevented from exiting the discharge system 34, as will be described in greater detail below.

The pressure switch 60 is fluidly coupled to the pipe 58 and in communication with an electrical circuit 70. The pressure switch 60 is generally a delta pressure switch and is disposed about the second section 68 of the pipe 58 to detect a change in the pressure of the fluid in the second section 68 of the pipe 58. Typically the pressure switch 60 operates to detect a drop in pressure along the second section 68 of the pipe 58. Based on the detected pressure drop in the second section 68 of the pipe 58, the electrical circuit 70 acts in response to the pressure switch 60 to close the valve 26. In particular, if the pressure drop detected by the pressure switch 60 exceeds a pre-selected value, the pressure switch 60 opens the electrical circuit 70 and prohibits electricity from reaching the second valve 26. The pre-selected pressure value depends on the tank parameters, but is generally equivalent to the pressure drop associated with liquid hydrogen entering the pipe 58. The pressure switch 60 may be any type of pressure sensing device which is capable of opening an electrical circuit 70. The pressure switch 60 detects a pressure drop as the liquid hydrogen flows through the pipe 58.

The electrical circuit 70 is in communication with the pressure switch 60, the power supply 28 and the second valve 26. The electrical circuit 70 is generally in a CLOSED position during the filling condition such that the electrical energy provided by the power supply 28 is allowed to flow through the electrical circuit 70 to the second valve 26 which causes the second valve 26 to enter the OPEN position. When the electrical circuit 70 is in an OPEN position, the electrical energy from the power supply 28 is prevented from flowing to the second valve 26, which causes the second valve 26 to enter the CLOSED position. Typically, the electrical circuit 70 switches between the OPEN and CLOSED position depending upon the input from the pressure switch 60, as will be discussed in greater detail below.

The power supply 28 is generally in communication with the first valve 24, and second valve 26 via the electrical circuit 70. The power supply 28 may be in communication with various other devices in the fuel cell system 10, or additional components on the motor vehicle (not shown) if desired. Typically, the power supply 28 is any type of device capable of providing a source of electrical energy to the first valve 24 and the second valve 26 via the electrical circuit 70, such as a battery, alternator or other similar devices. Alternatively, the power supply 28 may be provided by the fuel cell stack 12 (not shown).

The storage vessel 20 may also include the first fluid level indicator 36. The first fuel level indicator 36 is generally in communication with the controller 30. The first fuel level indicator 36 may be any type of device which may be disposed in the storage vessel 20 to produce a signal 74 (FIG. 1) to indicate the level of fluid in the storage vessel 20. In particular, the first fuel level indicator 36 may be a capacity sensor, however, any appropriate mechanism could be employed. Although the storage vessel 20 in this embodiment is described as including the first fluid level indicator 36, it shall be understood that the first fuel level indicator 36 may not necessarily be included in the storage vessel 20. The first fuel level indicator 36 may transmit a signal to the controller 30 indicating the level of fuel in the storage vessel 20.

The first valve 24 and second valve 26 are each fluidly coupled to the storage vessel 20. The first valve 24 and second valve 26 are operable in a first position and a second position. In the first position, the first and second valves 24, 26 are in the CLOSED position and fluid is not allowed to pass through either the first or second valves 24, 26. In the second position, the first and second valves 24, 26 are in the OPEN position, enabling the fluid to pass through the first and second valves 24, 26. In order to enable the first valve 24 and second valve 26 to operate in the second or OPEN position, each of the first and second valves 24, 26 require at least one source of electrical energy. Generally, the first valve 24 is operable to receive electricity from the power supply 28, while the second valve 26 is operable to receive electrical energy via the electrical circuit 70 coupled to the power supply 28, however, the first valve 24 and second valve 26 may be operable by any other appropriate mechanism, such as pressure.

The controller 30 is typically in communication with the first valve 24, second valve 26, first fluid level indicator 36 and power supply 28. Once the filling pipe 32 becomes coupled to the filling station 23, the controller 30 signals the power supply 28 to provide electrical energy to the first valve 24 and electrical circuit 70, and thus the second valve 26, to place the first valve 24 and second valve 26 in the OPEN position.

If the fuel supply system includes a first fuel level indicator 36, then the controller 30 is operable to receive the signal 74 from the first fuel level indicator 36 to provide a measurement of the fuel in the storage vessel 20. Based on the signal 74 from the first fuel level indicator 36, the controller 30 may send a signal to the power supply 28 to remove the electrical energy from the first valve 24 and the electrical circuit 70, which in turn operates to remove electrical energy from the second valve 26. The removal of the electrical energy from the first valve 24 and second valve 26 will cause the first valve 24 and second valve 26 to enter the CLOSED position and prevent further filling of the storage vessel 20 and further discharge of liquid hydrogen through the discharge system 34.

As a secondary system, the pressure switch 60 may also operate to ensure the end of a filling event. When the pressure switch 60 is employed in tandem with the first fuel level indicator 36, the pressure switch 60 acts as a back-up system to ensure the filling process ends. More specifically, the storage vessel 20 has begun a filling event and the first valve 24 and second valve 26 are in the OPEN position, the pressure switch 60 operates to read any pressure drops in the pipe 58 during the filling event. If the pressure switch 60 reads a pressure drop which exceeds the threshold pressure drop indicative of liquid hydrogen entering the pipe 58, the pressure switch 60 opens the electrical circuit 70, which removes the electrical energy from the second valve 26. By removing the electrical energy from the second valve 26, the second valve 26 will enter the first position or CLOSED position. Once the second valve 26 enters the CLOSED position, the controller 30 can receive a signal indicating the second valve 26 has entered the CLOSED position and thus, the controller 30 can direct the power supply 28 to remove electrical energy from the first valve 24 to end the filling event. Thus, the pressure switch 60 serves as a back-up mechanism to ensure the end of the filling event. Alternatively, it will be understood that the hydrogen supply unit 14 may include the pressure switch 60 as the primary mechanism for ending a fueling event, and thus the first fuel indicator 36 is not a required feature of the hydrogen supply unit 14.

Figure 3:
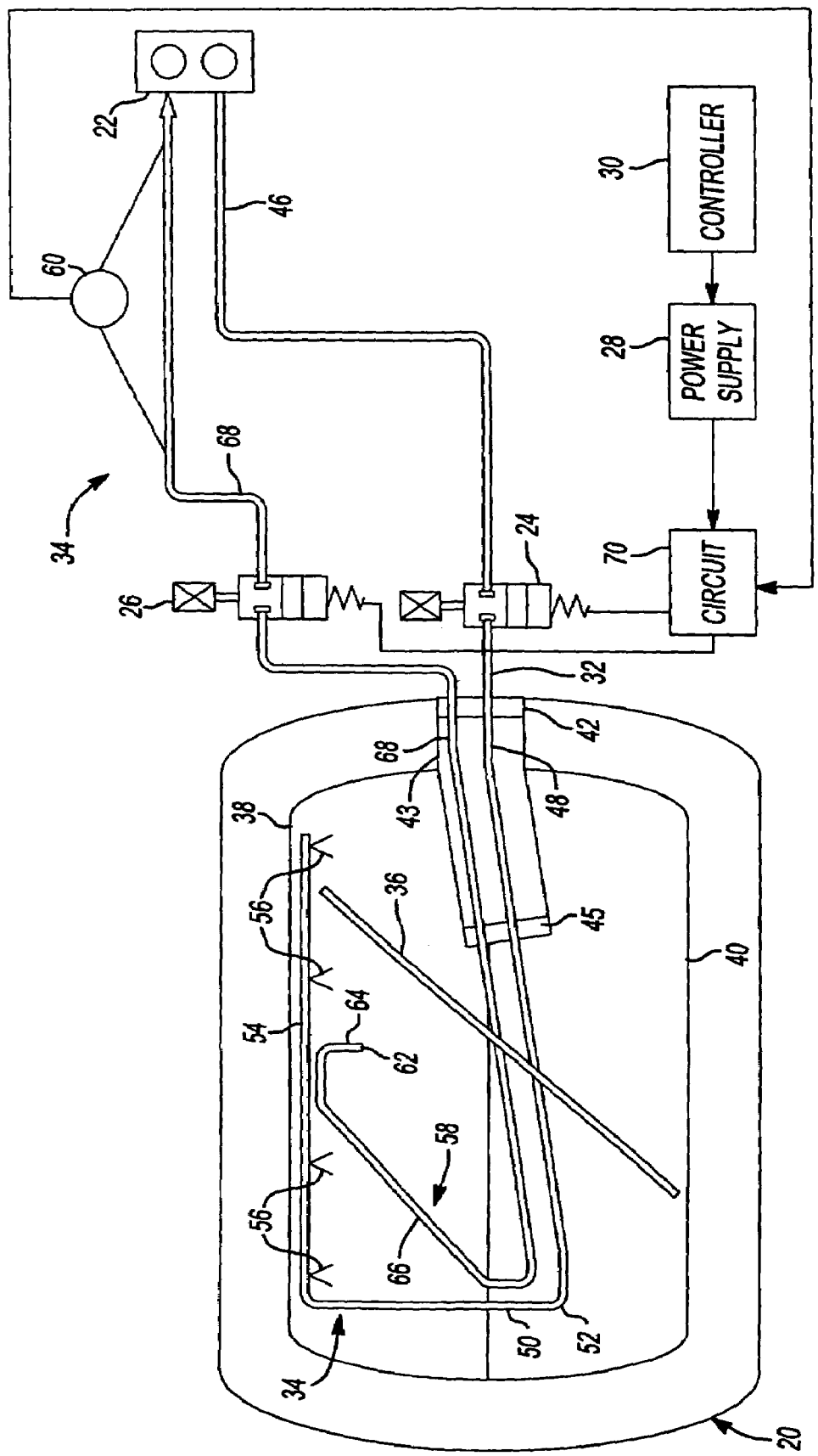
FIG. 3 is a detailed schematic of the overfill protection system according to an alternative embodiment.

In the alternative embodiment, as shown in FIG. 3, with common reference numerals used to denote the same or similar items, the electrical circuit 70 could provide both the first valve 24 and the second valve 26 with electrical energy. The pressure switch 60 may be coupled to the electrical circuit 70 and the pipe 58 of the discharge system 34. In this embodiment, when the pressure change exceeds the threshold for the change in pressure, the pressure switch 60 may then operate to open the electrical circuit 70, and remove electrical energy from both the first valve 24 and the second valve 26. Thus, in this alternative embodiment, the pressure switch 60 may operate to end a filling event by removing electrical energy simultaneously from the first valve 24 and the second valve 26. At the end of a filling event, the controller 30 may then reset the fuel cell system 10.

Accordingly, the present invention greatly improves the reliability and safety of the hydrogen supply unit 14 through using primary and secondary systems to prevent overfilling. The use of the pressure switch 60 in combination with the pipe 58 operates to ensure that some gaseous hydrogen remains in the storage vessel 20, increasing the stability of the storage vessel 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel supply system for a fuel cell system comprising:
a supply inlet that provides the fuel in a liquid phase;
a vessel coupled to the supply inlet to receive the fuel in the liquid phase;
a discharge passage coupled to the vessel to remove gaseous fuel from the vessel and to deliver the gaseous fuel to the supply inlet;
a sensor in communication with the discharge passage, the sensor in communication with a control system to interrupt the flow to the supply inlet based on a pressure drop in the discharge passage;
a fuel level indicator disposed within the vessel and in communication with the control system that generates a first signal based on a level of fuel in the vessel such that the control system interrupts the flow to the supply inlet based on the first signal; and
wherein the sensor transmits a second signal to the control system when the pressure drop in the discharge passage is approximately equal to a pressure associated with the fuel in the liquid phase entering the discharge passage such that the control system interrupts the flow to the supply inlet based on at least one of the first signal and the second signal.

2. The system of claim 1, further comprising:
a filling station disposed external to the fuel cell system, the filling station operable to provide the fuel;
a coupler that couples the supply inlet to the filling station; and
wherein the coupler couples the discharge passage to the filling station.

3. The system of claim 2, further comprising:
a first valve in fluid communication with the supply inlet and vessel, the first valve operable to open to enable the vessel to receive the fuel in the liquid phase;
a second valve in fluid communication with the discharge passage and the filling station, the second valve operable to open to enable the filling station to receive the fuel in the gaseous phase;
a power supply in communication with the first valve and second valve;
a controller in communication with the power supply; and
wherein the power supply provides, based on a signal from the controller, electrical energy to the first valve and the second valve to cause the first valve and second valve to open.

4. The system of claim 3, wherein the first signal generated by the fluid level indicator causes the controller to signal the power supply to remove electrical energy from the first valve and the electrical circuit.

5. The system of claim 3, further comprising:
an electrical circuit in communication with the power supply and the second valve; and
wherein the electrical circuit interrupts the flow of electrical energy from the power supply to the second valve upon receipt of the second signal from the sensor to cause the second valve to close.

6. The system of claim 5, wherein the controller signals the power supply to remove electrical energy from the first valve upon receipt of a signal from the second valve that the electrical energy to the second valve has been removed.

7. The system of claim 1, further comprising a fuel cell stack operable for receipt of the fuel in the liquid phase to generate electrical energy.

8. A fuel cell system comprising:
a fluid supply system operable in a first mode to provide a fluid in a liquid phase and operable in a second mode to prevent the supply of the fluid;
a vessel in fluid communication with the fluid supply system, the vessel receives the fluid in the liquid phase when the fluid supply system is in the first mode;
a discharge pipe coupled to the vessel to receive the fluid in a gaseous phase from the vessel and coupled to the fluid supply system to deliver the fluid in the gaseous phase to the fluid supply system;
a control system in communication with the fluid supply system to cause the fluid supply system to operate in the first mode or the second mode;
a fuel level indicator disposed within the vessel and in communication with the control system that generates a first signal based on a level of fuel in the vessel that causes the fluid supply system to operate in the second mode;
a delta pressure switch in communication with the discharge pipe, the fluid supply and the control system, the delta pressure switch generates a second signal for the control system that causes the fluid supply system to operate in the second mode when a pressure drop is detected above a predetermined level; and
wherein the pressure drop is detected when fuel in the liquid phase enters the discharge pipe.

9. The system of claim 8, wherein the fluid supply further comprises:
a filling station disposed external to the fuel cell system, the filling station operable to provide the fluid in the liquid phase;
a supply line in communication with the vessel to provide the vessel with the fluid in the liquid phase;
a coupler that couples the supply line to the filling station; and
wherein the coupler couples the discharge passage to the filling station.

10. The system of claim 9, wherein the fluid supply further comprises:
a first valve in fluid communication with the supply line and vessel, the first valve operable to open to enable the vessel to receive the fluid in the liquid phase;
a second valve in fluid communication with the discharge passage and the filling station, the second valve operable to open to enable the filling station to receive the fluid in the gaseous phase;
a power supply in communication with the first valve and second valve;
a controller in communication with the power supply; and
wherein the power supply is operable based on a signal from the controller to provide electrical energy to the first valve and the second valve to cause the first valve and second valve to open.

11. The system of claim 10, wherein the controller transmits a signal to the power supply based on the receipt of the first signal from the fluid level indicator which causes the fluid supply to operate in the second mode.

12. The system of claim 10, further comprising:
an electrical circuit in communication with the power supply and the second valve; and
wherein the electrical circuit is operable to interrupt the flow of electrical energy from the power supply to the second valve upon receipt of a signal from the delta pressure switch to cause the second valve to close.

13. The system of claim 12, wherein the controller is operable to signal the power supply to remove electrical energy from the first valve upon receipt of a signal from the second valve that the electrical energy to the second valve has been removed, thereby causing the fluid supply to operate in the second mode.

14. The system of claim 8, further comprising a fuel cell stack operable for receipt of the fluid in the liquid phase to generate electrical energy.

15. A fuel cell system comprising:
a filling station including a supply line;
a vessel operable to receive a fluid from the supply line;
a discharge pipe coupled to the vessel and operable to receive the fluid in a gaseous phase from the vessel and coupled to the filling station to deliver the fluid in the gaseous phase to the filling station;
a first valve in fluid communication with the supply line and vessel, the first valve operable to open to enable the vessel to receive the fluid in a liquid phase;
a second valve in fluid communication with the discharge pipe and the filling station, the second valve enables the filling station to receive the fluid in the gaseous phase;
a control system in communication with the first valve and second valve to open or close the first valve and second valve;
a fuel level indicator disposed within the vessel and in communication with the control system that generates a first signal that indicates when an amount of fluid in the vessel meets a predetermined threshold;
a delta pressure switch in communication with the discharge pipe and the control system, the delta pressure switch operable to interrupt the flow of the fluid through the discharge pipe in response to a detected pressure drop above a predetermined level, which indicates that fluid in the liquid phase has entered the discharge pipe;
a fuel cell stack in communication with the vessel to receive the fuel in the liquid phase to generate energy; and
wherein the delta pressure switch generates a second signal based on the detected pressure drop and the control system closes the second valve based on at least one of the first signal and the second signal.

16. The system of claim 15, wherein the control system further comprises:
a power supply in communication with the first valve and second valve;
a controller in communication with the power supply; and
wherein the power supply is operable based on a signal from the controller to provide electrical energy to the first valve and the second valve to cause the first valve and second valve to open.

17. The system of claim 16, wherein the controller signals the power supply to remove electrical energy from the first valve upon receipt of a signal from the second valve that the electrical energy to the second valve has been removed, thereby preventing the flow of fluid into the vessel.

18. The system of claim 16, wherein the controller transmits a signal to the power supply based on the receipt of the first signal from the fluid level indicator which causes the power supply to cease supplying electrical energy to the first valve and second valve.

* * * * *